(12) United States Patent
Montena et al.

(10) Patent No.: US 8,366,459 B2
(45) Date of Patent: Feb. 5, 2013

(54) COMPRESSION STYLE MID-SPAN GROUND CLAMP

(75) Inventors: Noah Montena, Syracuse, NY (US); David Jackson, Manlius, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 13 days.

(21) Appl. No.: 13/076,815

(22) Filed: Mar. 31, 2011

(65) Prior Publication Data
US 2012/0252237 A1 Oct. 4, 2012

(51) Int. Cl.
*H01R 4/66* (2006.01)
(52) U.S. Cl. ......................................... 439/98
(58) Field of Classification Search ................ 439/98, 439/99, 578
See application file for complete search history.

(56) References Cited

U.S. PATENT DOCUMENTS

| | | | |
|---|---|---|---|
| 3,233,035 A | 2/1966 | Black | |
| 3,989,340 A | 11/1976 | Sheldon et al. | |
| 4,341,922 A | 7/1982 | Bossard et al. | |
| 4,515,991 A | 5/1985 | Hutchison | |
| 4,538,021 A * | 8/1985 | Williamson, Jr. | 174/92 |
| 4,739,126 A * | 4/1988 | Gutter et al. | 174/78 |
| 4,808,072 A * | 2/1989 | Moore et al. | 416/5 |
| 4,872,626 A | 10/1989 | Lienart | |
| 4,885,432 A * | 12/1989 | Amoyal et al. | 174/92 |
| 4,933,512 A | 6/1990 | Nimiya et al. | |
| 5,122,068 A * | 6/1992 | Koss | 439/98 |
| 5,271,080 A | 12/1993 | Hopper et al. | |
| 5,444,810 A | 8/1995 | Szegda | |
| 5,498,839 A | 3/1996 | Behrendt et al. | |
| 5,594,212 A | 1/1997 | Nourry et al. | |
| 5,607,320 A | 3/1997 | Wright | |
| 5,685,072 A | 11/1997 | Wright | |
| 5,691,505 A | 11/1997 | Norris | |
| 5,713,748 A * | 2/1998 | Mulvihill | 439/98 |
| 5,722,841 A | 3/1998 | Wright | |
| 5,883,333 A | 3/1999 | Wambeke et al. | |
| 6,011,218 A | 1/2000 | Burek et al. | |
| 6,537,104 B1 | 3/2003 | Hagmann et al. | |
| 6,607,399 B2 | 8/2003 | Endo et al. | |
| 6,808,415 B1 | 10/2004 | Montena | |
| 6,809,265 B1 | 10/2004 | Gladd et al. | |
| 6,910,899 B1 * | 6/2005 | Daume | 439/100 |
| 7,005,582 B2 | 2/2006 | Muller et al. | |
| 7,018,221 B2 * | 3/2006 | Daume | 439/100 |
| 7,306,476 B2 * | 12/2007 | Gerlich et al. | 439/394 |
| 2003/0089517 A1 | 5/2003 | Takahashi et al. | |
| 2004/0048505 A1 * | 3/2004 | Daume | 439/98 |
| 2005/0048815 A1 * | 3/2005 | Daume | 439/98 |
| 2006/0281348 A1 | 12/2006 | Burris et al. | |
| 2007/0049073 A1 * | 3/2007 | Hill | 439/98 |
| 2007/0137877 A1 * | 6/2007 | Stansbie et al. | 174/78 |

* cited by examiner

*Primary Examiner* — Gary F. Paumen
(74) *Attorney, Agent, or Firm* — Schmeiser, Olsen & Watts, LLP

(57) ABSTRACT

A grounding clamp positioned on a coaxial cable at a location other than an end of the coaxial cable, wherein the grounding clamp includes an outer shell having a radial relationship with an elastomeric sleeve, the elastomeric sleeve being radially disposed over a conductive bonding contact, the conductive bonding contact being radially disposed over an outer conductive portion of the coaxial cable, wherein axial compression of the grounding clamp facilitates electrical contact between the outer shell and the conductive bonding contact and between the conductive bonding contact and the outer conductive portion of the coaxial cable. Furthermore, an associated method for maintaining ground continuity is also provided.

19 Claims, 4 Drawing Sheets

COMPRESSION STYLE MID-SPAN GROUND CLAMP

FIELD OF TECHNOLOGY

The following relates to grounding clamps used in coaxial cable communication applications, and more specifically to embodiments of a compression style mid-span grounding clamp fitted around a portion of a prepared coaxial cable.

BACKGROUND

Broadband communications have become an increasingly prevalent form of electromagnetic information exchange and coaxial cables are common conduits for transmission of broadband communications. Coaxial cables are typically designed so that an electromagnetic field carrying communications signals exists only in the space between inner and outer coaxial conductors of the cables. This allows coaxial cable runs to be installed next to metal objects without the power losses that occur in other transmission lines, and provides protection of the communications signals from external electromagnetic interference. Grounding clamps are provided at mid-span locations to establish electrically ground connections at mid-span locations. Grounding at midpoint locations divert lightning strike currents that may travel along the cable to the tower or other cabling specifically installed to handle high current and/or high voltage. However, in the field, grounding clamps located at mid-span locations on coaxial cables sometimes invite corrosion and environmental pollutants to enter the inner components of the coaxial cable and disrupt the electrical continuity between the coaxial cable and the grounding clamp.

Hence, a need exists for an improved mid-span grounding clamp that both seals the components from environmental pollutants and also ensures adequate electrical grounding connections at mid-span locations.

SUMMARY

A first general aspect of the invention provides a compression style mid-span coaxial cable grounding clamp device comprising an outer shell, having a first end and an opposing second end, wherein at least a portion of the outer shell is conductive, an elastomeric sleeve, sized for coaxial insertion within the outer shell between the first end and the second end, the elastomeric sleeve configured to substantially surround a prepared portion of a coaxial cable, a conductive bonding contact, sized for coaxial insertion within the elastomeric sleeve and having a conductive bridge member structured to make electrical contact with the outer shell, when the conductive bonding contact is disposed within the outer shell, and a first end compression seal member, sized so that a portion thereof is compressably insertable into the first end of the outer shell, wherein, when the first end compression seal member is compressed into a first end of the outer shell, the elastomeric sleeve is compressed moving the conductive bonding contact into contact with an outer conductor of the prepared coaxial cable when the cable is disposed within the grounding clamp device, and the first compression seal member forms an annular seal around an outer jacket of the coaxial cable at the first end of the outer shell, thereby effectively sealing the grounding clamp device to the coaxial cable.

A second general aspect of the invention provides a grounding clamp comprising, an outer shell surrounding an elastomeric sleeve, the outer shell having a first end and an opposing second end, a conductive member surrounded by the elastomeric sleeve, the conductive member surrounding an exposed outer conductive portion of a coaxial cable, wherein axial compression drives the conductive ring into contact with the exposed outer conductive portion of the coaxial cable to facilitate an adequate electrical grounding connection.

A third general aspect of the invention provides a device comprising a grounding clamp positioned on a coaxial cable at a location other than an end of the coaxial cable, wherein the grounding clamp includes an outer shell having a radial relationship with an elastomeric sleeve, the elastomeric sleeve being radially disposed over a conductive bonding contact, the conductive bonding contact being radially disposed over an outer conductive portion of the coaxial cable, wherein axial compression of the grounding clamp facilitates electrical contact between the outer shell and the conductive bonding contact and between the conductive bonding contact and the outer conductive portion of the coaxial cable.

A fourth general aspect of the invention provides a method for maintaining ground continuity through a coaxial cable comprising providing a grounding clamp comprising an outer shell having a first end and an opposing second end, wherein at least a portion of the outer shell is conductive, an elastomeric sleeve, sized for coaxial insertion within the outer shell between the first end and the second end, the elastomeric sleeve configured to substantially surround a prepared portion of a coaxial cable, a conductive bonding contact, sized for coaxial insertion within the elastomeric sleeve and having a conductive bridge member structured to make electrical contact with the outer shell, a first end compression seal member, sized so that a portion thereof is compressably insertable into the first end of the outer shell, and a second end compression seal member, sized so that a portion thereof is insertable into the second end of the outer shell, and compressing the grounding clamp to securably attach and seal the grounding clamp to the coaxial cable.

The foregoing and other features of construction and operation of the invention will be more readily understood and fully appreciated from the following detailed disclosure, taken in conjunction with accompanying drawings.

BRIEF DESCRIPTION OF THE DRAWINGS

Some of the embodiments of this invention will be described in detail, with reference to the following figures, wherein like designations denote like members, wherein.

DETAILED DESCRIPTION

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a", "an" and "the" include plural referents, unless the context clearly dictates otherwise.

Figure 1:
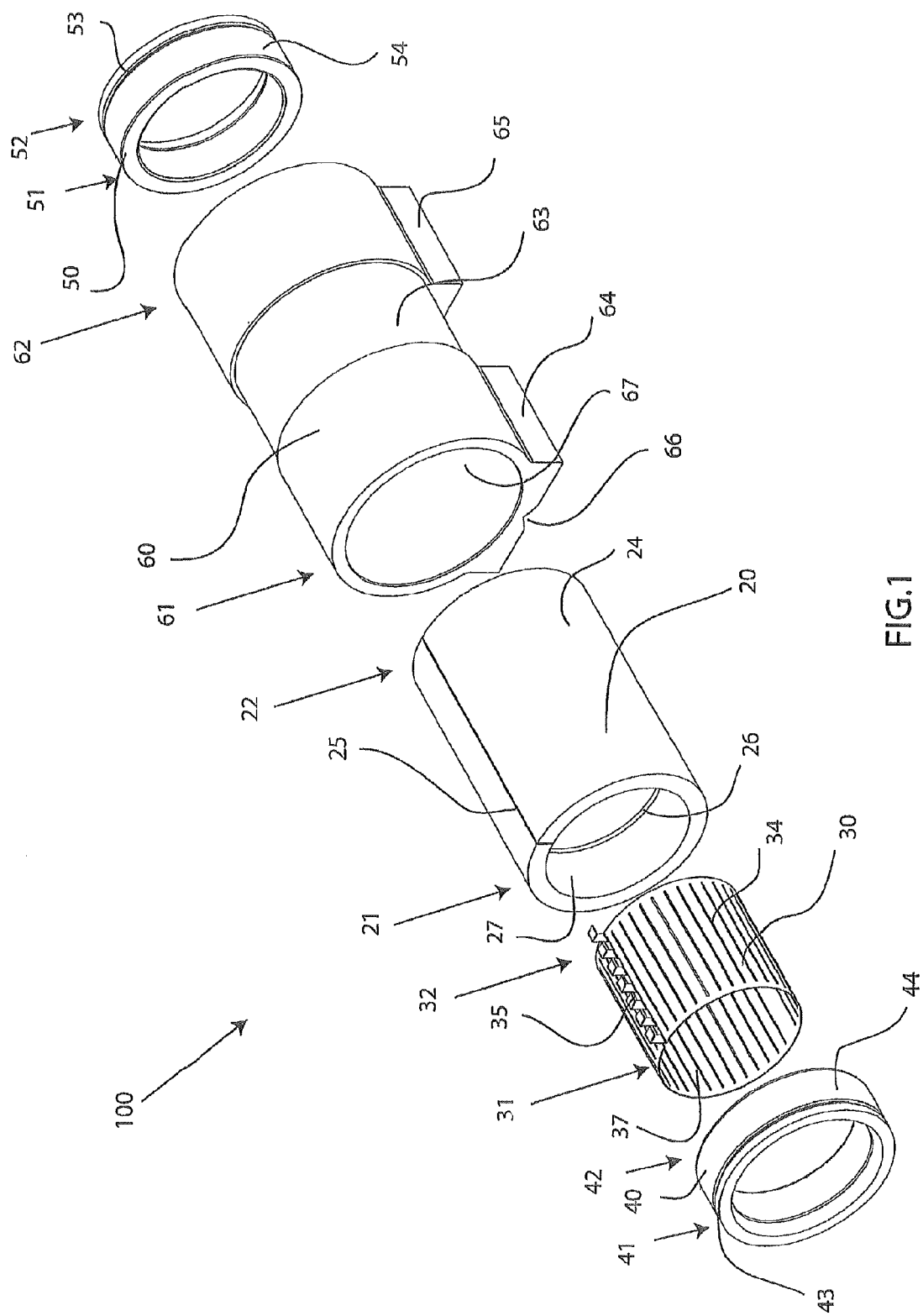
FIG. 1 depicts an exploded perspective view of an embodiment of the elements of an embodiment of a grounding clamp.

Referring to the drawings, FIG. 1 depicts one embodiment of a grounding clamp 100. The grounding clamp 100 may be operably affixed to a coaxial cable 10 so that the grounding clamp 100 is securely attached to the cable 10. The coaxial cable 10 may include a protective outer jacket 12, a conductive grounding shield 14, a dielectric foil layer 15, an interior dielectric 16 and a center conductor 18. The protective outer jacket 12 is intended to protect the various components of the coaxial cable 10 from damage which may result from exposure to dirt or moisture and from corrosion. Moreover, the protective outer jacket 12 may serve in some measure to secure the various components of the coaxial cable 10 in a contained cable design that protects the cable 10 from damage related to movement during cable installation. The conductive grounding shield 14 may be comprised of conductive materials suitable for providing an electrical ground connection. Various embodiments of the shield 14 may be employed to screen unwanted noise. For instance, the shield 14 may comprise a metal foil wrapped around the dielectric 16, or several conductive strands formed in a continuous braid around the dielectric 16. Combinations of foil and/or braided strands may be utilized wherein the conductive shield 14 may comprise a foil layer, then a braided layer, and then a foil layer. Those in the art will appreciate that various layer combinations may be implemented in order for the conductive grounding shield 14 to effectuate an electromagnetic buffer helping to prevent ingress of environmental noise that may disrupt broadband communications. The dielectric 16 may be comprised of materials suitable for electrical insulation. It should be noted that the various materials of which all the various components of the coaxial cable 10 are comprised should have some degree of elasticity allowing the cable 10 to flex or bend in accordance with traditional broadband communications standards, installation methods and/or equipment. It should further be recognized that the radial thickness of the coaxial cable 10, protective outer jacket 12, conductive grounding shield 14, dielectric foil layer 15, interior dielectric 16 and/or center conductor 18 may vary based upon generally recognized parameters corresponding to broadband communication standards and/or equipment.

Figure 2A:
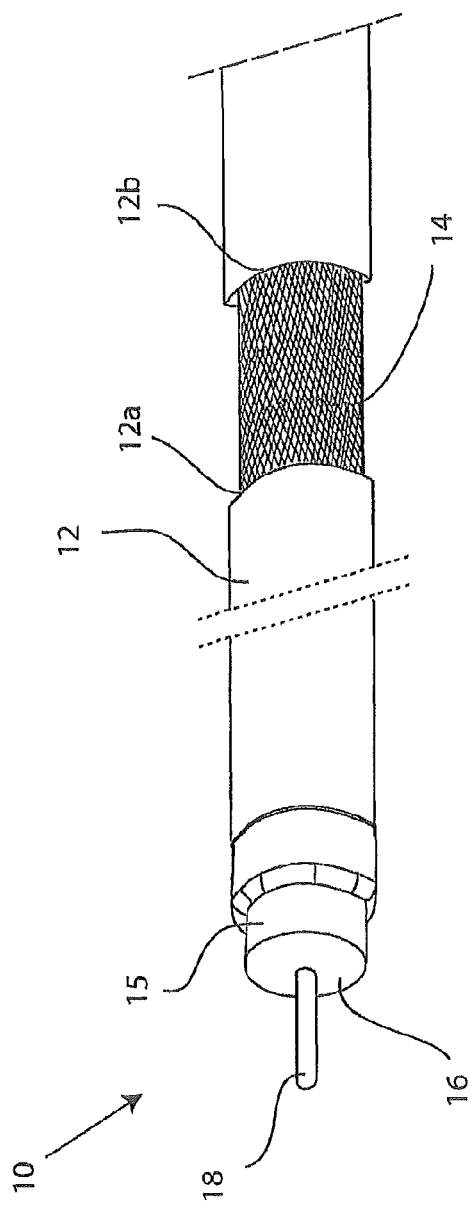
FIG. 2A depicts a perspective view of a first embodiment of a prepared coaxial cable.
Figure 2B:
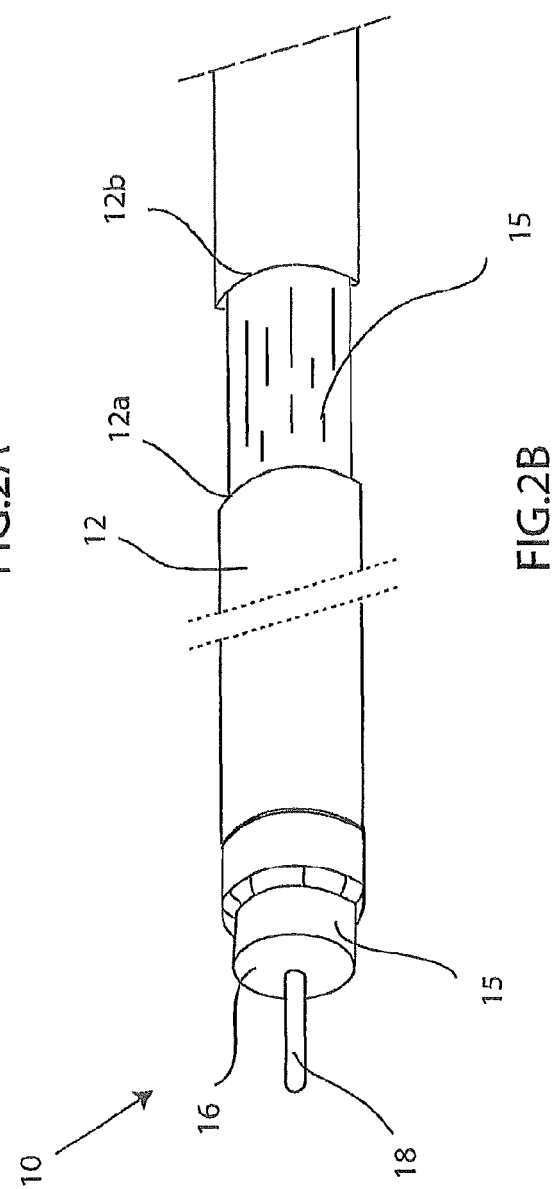
FIG. 2B depicts a perspective view of a second embodiment of a prepared coaxial cable.

The coaxial cable 10 may be prepared as embodied in FIG. 2A and FIG. 2B by removing a portion of the protective outer jacket 12 to expose a conductive portion of the coaxial cable 10. In one embodiment, removing a portion of the outer jacket 12 exposes a portion of the conductive grounding shield 14 at some point along the coaxial cable 10. In an alternative embodiment, a portion of the outer jacket 12 may be removed and a portion of the conductive grounding shield 14 may be removed to expose a portion of the dielectric foil layer 15 surrounding the interior dielectric 16. The removal of the outer jacket 12 may include stripping off a section of the outer jacket 12. For example, a section or portion of the outer jacket 12 may be completely removed, stripped, extracted, cut away, cut out, etc., such that an outer conductive portion of the coaxial cable 10, such as the conductive grounding shield 14, is exposed. In most embodiments, an annular section of the outer jacket 12 is removed, exposing an annular outer surface of a conductive portion of the coaxial cable 10. The outer conductive portion of the coaxial cable 10 may be, inter alia, a solid smooth-wall tubing or a solid corrugated tubing. Removing a portion of the outer jacket 12 can create a break in the outer jacket 12, defined by two outer jacket edges 12a, 12b. Outer jacket edge 12a is separated from outer jacket edge 12b by a section of conductive portion of the coaxial cable 10, the conductive portion of the grounding cable being recessed a distance substantially equal to the thickness of the outer jacket 12. Furthermore, at one or both ends, the coaxial cable 10 may be prepared by drawing back a portion of the outer jacket 12 and grounding shield to expose a portion of the dielectric foil layer 15 surrounding the dielectric 16 and the center conductor 18 for operable attachment to a coaxial cable connector.

Referring back to FIG. 1, the grounding clamp 100 is configured to attach to a coaxial cable 10 at a mid-span location. A mid-span location should not be limited to a midpoint of a coaxial cable 10; a mid-span location may be any location along the coaxial cable 10 that is a distance away from either end of the cable 10. There may be more than one grounding clamp 100 located at various points along the cable 10 to facilitate adequate grounding of the cable 10 at a location other than the ends. Before an end of a coaxial cable 10 is lashed to a tower, such as a cell tower, one or more grounding clamps 100, in particular, the outer shell 60, can be slid onto the cable 10, such that one end of the cable 10 is inserted into and passed through the inner diameter pathway 3 of the grounding clamp 100. The one or more grounding clamps 100 may then be slid further along the cable 10 to an approximate final or desired location along the cable 10. In many embodiments, the outer shell 60 of the grounding clamp 100 is slid into an approximate final or desired position prior to or sometime after removing a portion of the outer jacket 12 the coaxial cable 10. An approximate final or desired position simply means that the grounding clamp 100 is proximate or otherwise near the exact final location. Once the grounding clamp 100 (i.e. outer shell 60) is slid into an approximate final or desired position, the coaxial cable 10 may be prepared by removing a portion of the outer jacket 12 to expose an outer conductive portion of the coaxial cable 10. Generally, the cable 10 is fitted with grounding clamp(s) 100 while the cable 10 is still on the ground, for example, before the cable 10 is lashed to a newly constructed tower. However, as long as the cable 10 has a free end (i.e. end has not been lashed to a tower), a grounding clamp 100 may be operably attached to a coaxial cable 10, regardless of the height, location, etc., of the cable 10. After the coaxial cable 10 is prepared, the outer shell 60 of the grounding clamp 100 may be slid over the elastomeric sleeve 20 which is positioned over the break in the outer jacket 12, while internal surface features 26a, 26b, such as annular detents, ridges, bumps, lips, etc. catch outer jacket edges 12a, 12b, respectively. The interaction between the internal surface features 26a, 26b and the outer jacket edges 12a, 12b may prevent or substantially hinder axial movement of the grounding clamp 100 along the cable 10. The grounding clamp 100 may be closed, or secured, to the cable 10 by a compression tool, which axially compresses the grounding clamp 100 to effectively seal and secure the grounding clamp 100 to the cable 10. Because the grounding clamp 100 is a uniform, or one-piece grounding clamp, there is no frontal joint or abutment of two or more outer components which usually invites ingress of environmental pollutants, such as dirt and moisture.

Moreover, the grounding clamp 100 may be completely or substantially preassembled before positioning on the cable 10. For example, the preassembled grounding clamp 100 may be slid along the cable 10 into a final position where the mid span grounding is to occur. Once the preassembled grounding clamp 100 is slid along the cable 10 into the final position, the ends of the grounding clamp 100 may be axially compressed, securably attaching the clamp 100 to the cable 10.

With continued reference to FIG. 1, an embodiment of a grounding clamp 100 having a first end 1, an opposing second 2, and an inner diameter pathway 3 is now described. The whole, or one-piece, grounding clamp 100 may include an outer shell 60, an elastomeric sleeve 20, a conductive bonding contact 30, a first end compression member 40, and a second end compression member 50. In another embodiment, a compression style mid-span coaxial cable grounding clamp device 100 may comprise an outer shell 60, having a first end 61 and an opposing second end 62, wherein at least a portion of the outer shell 60 is conductive, an elastomeric sleeve 20, sized for coaxial insertion within the outer shell 60 between the first end 61 and the second end 62, the elastomeric sleeve 20 configured to substantially surround a prepared portion of a coaxial cable 10, a conductive bonding contact 30, sized for coaxial insertion within the elastomeric sleeve 20 and having a conductive bridge member 35 structured to make electrical contact with the outer shell 60, when the conductive bonding contact 30 is disposed within the outer shell 60, a first end compression member 40, sized so that a portion thereof is compressably insertable into the first end 61 of the outer shell 60, and a second end compression member 50, sized so that a portion thereof is insertable into the second end 62 of the outer shell 60, wherein, when the first end compression member 40 and the second end compression member 50 are compressed into respective first and second ends 61, 62 of the outer shell 60, the elastomeric sleeve 20 is compressed moving the conductive bonding contact 30 into contact with an outer conductor of the prepared coaxial cable 10 when the cable 10 is disposed within the grounding clamp device 100, and the first and second compression seal members 40, 50 form annular seals around an outer jacket 12 of the coaxial cable 10 at the first and second ends 61, 62 of the outer shell 60, thereby effectively sealing the grounding clamp device 100 to the coaxial cable 10. In another embodiment, grounding clamp 100 may comprise an outer shell 60 surrounding an elastomeric sleeve 20, the outer shell 60 having a first end 61 and an opposing second end 62, a conductive member 30 surrounded by the elastomeric sleeve 20, the conductive member 30 surrounding an exposed outer conductive portion of a coaxial cable 10, wherein axial compression drives the conductive member 30 into contact with the exposed outer conductive portion of the coaxial cable 10 to facilitate an adequate electrical grounding connection. In yet another embodiment, the grounding clamp 100 may be positioned on a coaxial cable 10 at a location other than an end of the coaxial cable 10, wherein the grounding clamp 100 includes an outer shell 60 having a radial relationship with an elastomeric sleeve 20, the elastomeric sleeve 20 being radially disposed over a conductive bonding contact 30, the conductive bonding contact 30 being radially disposed over an outer conductive portion of the coaxial cable 10, wherein axial compression of the grounding clamp 100 facilitates electrical contact between the outer shell 60 and the conductive bonding contact 30, and between the conductive bonding contact 30 and the outer conductive portion of the coaxial cable 10.

Referring still to FIG. 1, the outer shell 60 of embodiments of a mid-span grounding clamp 100 has a first end 61 and opposing second end 62. The outer shell 60 includes a generally axial opening, as shown in FIG. 1, and can house, encompass, surround, cover, sheath, or be radially disposed over, the coaxial cable 10, conductive bonding contact 30, and elastomeric sleeve 20. Outer shell 60 may also be a housing, enclosure, covering, structure, frame, body, and the like. The structural configuration of the outer shell 60 may vary accordingly to accommodate different functionality of a grounding clamp 100. In one embodiment, outer shell 60 may be a generally annular member. In another embodiment, outer shell 60 may be a generally annular member including a first base member 64 and a second base member 65 positioned on the underside of the outer shell 60. The first base member 64 may be spaced away a distance from the second base member 65. Alternatively, a single, uniform base member (i.e. an undivided base member) may be positioned on the underside of the outer shell 60. In some embodiments, the first and second base members 64, 65 may be rectangular in shape, and have a flat top and bottom surface. Moreover, the first base member 64 and the second base member 65 may include an axially extending groove 66 on the bottom surface of the base members 64, 65. Groove 66 may have various cross-sections, such as triangular, rectangular, circular, or any general polygonal cross-section.

The outer shell 60 may include a means to secure the grounding clamp 100 to a structural element on the tower. For example, the base and/or the first and second base member 64, 65 may include some structural element that facilitates attachment to a structural element on the tower. In one embodiment, the base of the outer shell 60 may include openings, holes, threaded bolt holes, bores, threaded bolt studs, or slots through which a fastening member may pass to secure the grounding clamp 100 to the tower or a structural element of the tower. In another embodiment, a strap may encircle the grounding clamp 100 around the outer shell 60 or partially around the outer shell 60 and through openings, holes, etc. located on the base of the outer shell. The strap may have a fastening device suitable for tightening (i.e. reducing diameter of strap to provide radial compression). Thus, the grounding clamp 100 may be structured to provide physical support to the cable, in addition to grounding the cable at various points along the cable 10.

Furthermore, outer shell 60 has an internal surface 67 and an external surface 68. The external surface 68 of the outer shell 60 may include a recessed surface 63 proximate or otherwise near a middle portion of the outer shell 60. The internal surface 67 of the outer shell 60 can physically contact the outer surface 24 of the elastomeric sleeve 20, while grounding clamp 100 is operably attached to cable 10. For example, the outer shell 60 may generally surround, encompass, sheath, cover, accommodate, etc., the elastomeric sleeve 20. In another embodiment, the outer shell 60 is radially disposed over the elastomeric sleeve 20. In yet another embodiment, the elastomeric sleeve 20 is coaxially inserted into the generally axial opening of the outer shell 60. The outer shell 60 may be formed of conductive materials facilitating grounding through grounding clamp 100. Accordingly the outer shell 60 may be configured to extend an electromagnetic buffer by electrically contacting conductive surfaces of a conductive connector, such as a grounding bar or bus bar. In addition, the outer shell 60 may be formed of both conductive and non-conductive materials. For example the external surface 68 of the outer shell 60 may be formed of a polymer, while the remainder of the outer shell 60 may be comprised of a metal or other conductive material. The outer shell 60 may be formed of metals or polymers or other materials that would facilitate a shell body responsive to compression. Manufacture of the outer shell 60 may include casting, extruding, cutting, knurling, turning, tapping, drilling, injection molding, blow molding, or other fabrication methods that may provide efficient production of the component.

Referring still to FIG. 1, an embodiment of a grounding clamp 100 may include an elastomeric sleeve 20 configured for coaxial insertion into the outer shell 60. The elastomeric sleeve 20 comprises a first end 21 and opposing second end 22, and may be radially disposed over a prepared coaxial cable 10 and conductive bonding contact 30. For example, the elastomeric sleeve 20 may be configured to encircle or substantially surround a coaxial cable 10 and the conductive bonding contact 30. The elastomeric sleeve 20 may be a generally annular member, having an outer diameter slightly smaller than the inner diameter of the outer shell 60. The slightly smaller outer diameter of the sleeve 20 allows the sleeve 20 to fit within the outer shell 60. Furthermore, the elastomeric sleeve 20 comprises an internal surface 27 and an external surface 24. In many embodiments, the external surface 24 of the elastomeric sleeve 20 may physically contact the internal surface 67 of the outer shell 60, and a middle portion of the internal surface 27 may contact the external surface 34 of the conductive bonding contact 30, while the outer portions of the internal surface 27 of the elastomeric sleeve 20 contact an outer surface of the coaxial cable 10. In other words, the elastomeric sleeve 20 may share a radial relationship with the outer shell 60. For example, the elastomeric sleeve 20 may generally surround, encircle, wrap around, encompass, sheath, cover, accommodate, etc., the conductive bonding contact 30. Prior to compression of the grounding clamp 100, there may be a permissible range of slight variation in the dimensions of the outer shell 60, the elastomeric sleeve 20, and conductive bonding contact 30. In particular, a slight radial tolerance may exist between the components of the grounding clamp 100 prior to compression of the grounding clamp 100 during installation.

Moreover, sleeve 20 includes a slit 25 that can allow a portion of a conductive bridge member 35 to pass through the sleeve 20 to electrically contact the internal surface 67 of the outer shell 60. Slit 25 may be a slit, slot, opening, or aperture between two portions of the sleeve 20. In one embodiment, slit 25 may be formed by an abutment of two edges of a curved piece of elastomeric material, such as elastomeric sleeve 20. Alternatively, slit 25 may be formed by cutting, slicing, scoring, piercing, etc. a whole, one-piece elastomeric sleeve 20 in an axial direction along from a first end 21 to a second end 22. During installation, the resilient elastomeric sleeve 20 may be spread open because of the slit 25 and then subsequently radially disposed over the conductive bonding contact 30 and coaxial cable 10. Because the elastomeric sleeve 20 is resilient, it will regain a generally annular or cylindrical shape and encompass the conductive bonding contact 30 and the cable 10. When the elastomeric sleeve 20 is disposed over the conductive bonding contact 30, the conductive bridge member 35 (e.g. plurality of conductive tabs) should emerge, pass through, poke through, protrude, extend, etc., through the slit 25 such that the conductive bridge member 35 is exposed and may contact the internal surface 67 of the outer shell 60. Thus, a folded portion of the of the protruding portions of the conductive bridge member 35 rests on the external surface 24 of the elastomeric sleeve 20, in position to contact the internal surface 67 of the outer shell. In other words, prior to axial compression of the grounding clamp 100 components, the conductive bridge member 35 may contact the internal surface 67 of the outer shell 60. After the grounding clamp 100 is compressably affixed to the coaxial cable 10 over the exposed conductive portion of the coaxial cable 10, the conductive bridge member 35 should constantly contact the outer shell 60 through the slit 25 of the elastomeric sleeve 20 due to the compressive forces. Alternatively, the elastomeric sleeve 20 may be slid along the cable 10 to a final position, provided one end of the cable is free (i.e. not lashed to a tower). Those having ordinary skill in the art should appreciate that other means may be used to allow a portion of the conductive bonding contact 30 to contact the outer shell 60.

Further still, an embodiment of the elastomeric sleeve 20 may include at least one surface feature 26, such as an annular detent, groove, bump, ridge, or lip that may engage an outer jacket edge 12a, 12b to prevent or hinder axial movement of the grounding clamp 100 relative to the coaxial cable 10 when in a final position over a prepared portion of the coaxial cable 10. For instance, when sliding the outer shell 60 along the cable 10 to its final exact location over the elastomeric sleeve 20, conductive bonding contact 30, and exposed conductive portion of the coaxial cable 10, the engagement of the at least one internal surface feature 26 and outer jacket edge 12a (12b) may prevent further axial movement of the grounding clamp 100 along the cable 10. In some embodiments, two internal surface features 26a, 26b may be positioned on the internal surface 27 of the elastomeric sleeve. Moreover, the elastomeric sleeve 20 should be formed of an elastic polymer, such as rubber, or any resilient material responsive to compression and/or deformation. Manufacture of the elastomeric sleeve 20 may include casting, extruding, cutting, turning, drilling, compression molding, injection molding, spraying, or other fabrication methods that may provide efficient production of the component.

Figure 1A:
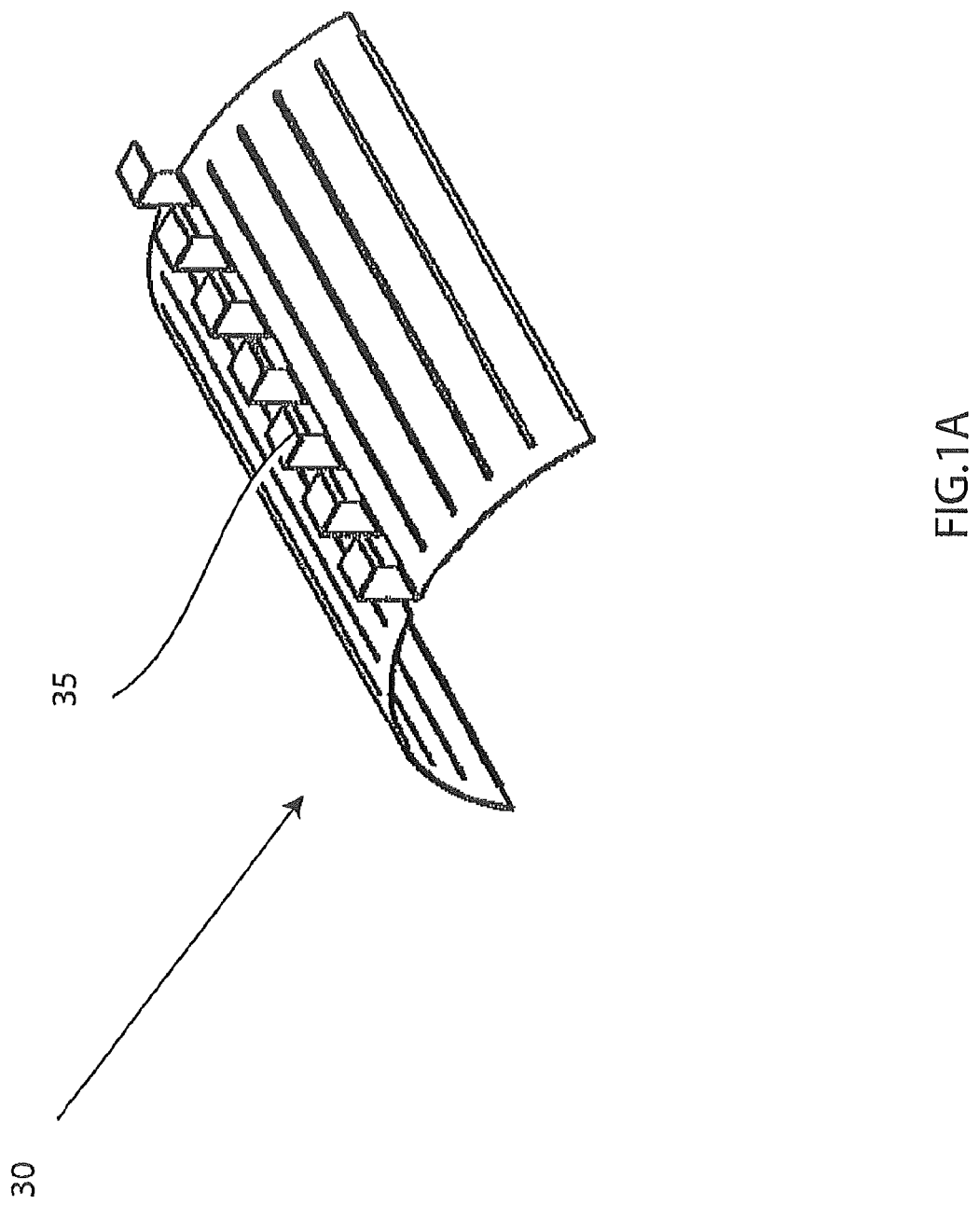
FIG. 1A depicts a perspective view of an embodiment of a conductive bonding contact.

With continued reference to FIG. 1, an embodiment of a grounding clamp 100 may also include a conductive bonding contact 30, the conductive bonding contact 30 being a generally annular member, having a first end 31 and an opposing second end 32. The conductive bonding contact 30 may be radially disposed over the prepared coaxial cable 10. For example, the conductive bonding contact 30 can be sized for coaxial insertion within the elastomeric sleeve 20. Additionally, the conductive bonding contact 30 may only partially surround the cable 10 such that it only touches a portion of the cable 10, as depicted in FIG. 1A. For instance, the conductive bonding contact 30 may have a semi-annular cross section, or similar cross section. Alternatively, the conductive bonding contact 30 may substantially surround the prepared coaxial cable 10. However, the conductive bonding contact may also partially surround the prepared coaxial cable 10. In one embodiment, the conductive bonding contact 30 only wraps around the exposed conductive portion of the prepared coaxial cable 10, such as the conductive grounding shield 14 or dielectric foil layer 15. In another embodiment, the conductive bonding contact 30 may substantially encircle both the exposed conductive portion of the coaxial cable 10 and a portion of the remaining (i.e. unremoved) outer jacket 12 on either side of the conductive bonding contact 30. Additionally, the conductive bonding contact 30 may share a radial relationship with the elastomeric sleeve 20 and the outer shell 60, wherein the conductive bonding contact 30 is radially disposed within the elastomeric sleeve 20 and outer shell 60. The conductive bonding contact 30 has an external surface 34 and an internal surface 37, wherein the external surface 34 contacts the internal surface 27 of the elastomeric sleeve 20, and the internal surface 37 contacts an outer surface of a prepared coaxial cable 10, such as conductive grounding shield 14.

Further still, the conductive bonding contact 30 may include a conductive bridge member 35 axially positioned on the external surface 34 of the conductive bonding contact 30. While operably configured, the location of the conductive bridge member 35 should correspond to the location of the slit 25 of the elastomeric sleeve 20 to allow the bridge member 35 to pass through the slit 25 with the least possible interference. For instance, the conductive bridge member 35 should be substantially underneath the slit 25 of the elastomeric sleeve 20 to facilitate electrical continuity between the conductive bonding contact 30 and the outer shell 60. The conductive bridge member 35 may comprise one or more protruding members, such as tabs, hooks, L-shaped members, sharing a linear relationship with each other. The conductive bridge member 35 and its components should be made of the same conductive material as the conductive bonding contact 30. The conductive bonding contact 30 should be a formed of a conductive material, such as a metal, or similar materials sharing similar conductive properties. Moreover, conductive bonding contact 30 may be resilient, pliable, flexible, and the like. Alternatively, the conductive bonding contact 30 may be a rigid or semi-rigid structure that deforms when subject to compressive forces. The conductive bonding contact 30 may be a member, element, and/or structure that contacts the outer conductive portion of the coaxial cable 10 while also contacting the outer shell 60 of the grounding clamp 100, thereby establishing and maintaining physical and electrical contact between them. Optional openings, or slots, may be located on the body of the conductive bonding contact 30. Manufacture of the conductive bonding contact 30 may include casting, extruding, cutting, turning, rolling, stamping, photo-etching, laser-cutting, water-jet cutting, and/or other fabrication methods that may provide efficient production of the component.

Referring still to FIG. 1, embodiments of a mid-span compression style grounding clamp, such as grounding clamp 100, may also include a first end compression member 40 radially disposed over a coaxial cable 10. The first end compression member 40 may comprise a first end 41 and opposing second end 42. The first end compression member 40 may be a generally annular member, having an outer edge 44. Proximate or otherwise near the first end 41 of the first end compression member 40 may be an annular flange 43. A portion of the first end compression member 40 may be inserted into the outer shell 60 proximate the first end 61. For example, upon insertion, the outer edge 44 may physically contact the internal surface 67 of the outer shell proximate the first end 61, while the annular flange 43 may remain exposed (i.e. not in contact with the internal surface 67 of the outer shell 60). The first end compression member 40 may be inserted into the first end 61 of the outer shell and axially compressed into an operable position, wherein the axial compression is actuated by various means, such as a compression tool keyed for applying axial compression to compression connectors, or such as a wrench that can assist in threading, rotating, turning, etc. the compression member into a compressed position in association with the clamp, such as grounding clamp 100. The compression fit of the first end compression member 40 proximate or otherwise near the first end 61 of the outer shell 60 effectively seals the first end 1 of grounding clamp 100 and protects the grounding clamp 100 from corrosion and/or environmental pollutants, such as rain water and moisture which may migrate along the cable 10. The first end compression member 40 may also have a groove in it for an O-ring that can help assist in sealing the first end compression member 40. For example, an annular recess or annular detent may be positioned on the inner surface of the first end compression member 40 to accommodate a resilient O-ring, or similar annular member. Additionally, the axial compression of the first end compression member 40 compresses the elastomeric sleeve 20, which drives the conductive bonding contact 30 into the exposed outer conductive portion of the coaxial cable 10. Furthermore, the first end compression member 40 may be formed of conductive or non-conductive materials or a combination thereof. Manufacture of the first end compression member 40 may include casting, extruding, cutting, turning, drilling, knurling, injection molding, spraying, blow molding, component overmolding, combinations thereof, or other fabrication methods that may provide efficient production of the component.

With further reference to FIG. 1, embodiments of grounding clamp 100 may also include a second end compression member 50. The first second end compression member 50 may comprise a first end 51 and opposing second end 52. The second end compression member 50 may be a generally annular member, having an outer edge 54. Proximate or otherwise near the second end 52 of the second end compression member 50 may be an annular flange 53. A portion of the second end compression member 50 may be coaxially inserted into the outer shell 60 proximate or otherwise near the second end 62. For example, upon insertion, the outer edge 54 may physically contact the internal surface 67 of the outer shell proximate or otherwise near the second end 62, while the annular flange 53 may remain exposed (i.e. not in contact with the internal surface 67 of the outer shell 60). The second end compression member 50 may be inserted into the second end 62 of the outer shell 60 and axially compressed into an operable position, wherein the compression is actuated by various means, such as a compression tool keyed for applying axial compression, or such as a wrench that can assist in threading, rotating, turning, etc. the compression member into a compressed position in association with the clamp, such as grounding clamp 100. The compression fit of the second end compression member 50 proximate or otherwise near the second end 62 of the outer shell 60 effectively seals the second end 2 of grounding clamp 100 and protects the grounding clamp 100 from corrosion and/or environmental pollutants, such as rain water and moisture which may migrate along the cable 10. The second end compression member 50 may also have a groove in it for an 0-ring that can help assist in sealing the second end compression member 50. For example, an annular recess or annular detent may be positioned on the inner surface of the second end compression member 50 to accommodate a resilient O-ring, or similar annular member. Additionally, the axial compression of the second end compression member 50 compresses the elastomeric sleeve 20, which drives the conductive bonding contact 30 into the exposed outer conductive portion of the coaxial cable 10. Furthermore, the second end compression member 50 may be formed of conductive or non-conductive materials or a combination thereof. Manufacture of the second end compression member 50 may include casting, extruding, cutting, turning, drilling, injection molding, spraying, blow molding, component overmolding, combinations thereof, or other fabrication methods that may provide efficient production of the component.

Figure 3:
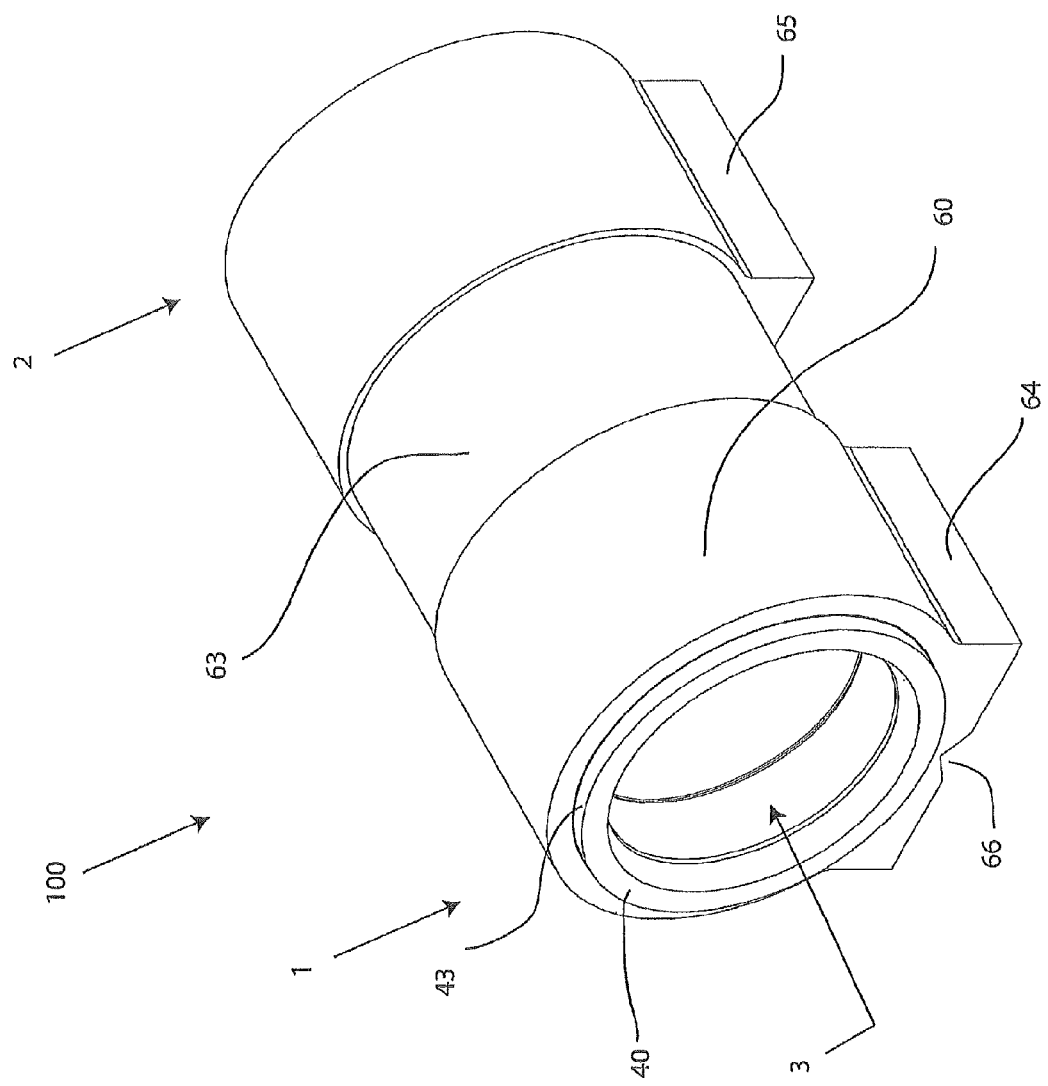
FIG. 3 depicts a perspective cut-away view of an embodiment of a grounding clamp.

Turning now to FIGS. 1-3, the manner in which the grounding clamp 100 may be operably affixed, attached, secured, closed, locked, sealed etc. to a prepared coaxial cable 10 involves axial compression of the grounding clamp 100. After the outer shell 60 is slid along the cable 10 into an approximate final position and a portion of the outer jacket 12 is removed to create a break and expose an outer conductive portion of the coaxial cable 10, the outer shell 60 may be slid over the break over the elastomeric sleeve 20 as the internal surface feature(s) 26 mate with the outer edges 12a, 12b of the outer jacket 12 to stop or prevent further axial movement of the grounding clamp 100 along the cable 10. Once into the exact, desired location where mid span grounding is to occur, a compression tool may be used to axially compress (i.e. exert an axially inward force) the grounding clamp 100 to securably affix the grounding clamp 100 to the prepared coaxial cable 10. Any device, method, or means for producing axially forces against the first and second ends 1, 2 of the grounding clamp to axially compress the grounding clamp 100 may be used. In particular, the first end compression member 40 is axially compressed into the first end 61 of the outer shell 60, and the second end compression member 50 is axially compressed into the second end 62 of the outer shell 60, usually simultaneously.

Alternatively, one of the first or second end compression members 40, 50 may not be moveable, while the other is compressed into an end of the grounding clamp 100. For example, the first end compression member 40 may not be moveable (i.e. preassembled into position, stationary, or designed to fit within the diameter of the first end without the need for compression), while the second end compression member 50 is axially compressed into the second end 62 of the outer shell 60. Thus, only one end of the grounding clamp 100 would require axial compression to securably affix the grounding clamp 100 to the cable 10. In another alternative embodiment, the first and second end compression members 40, 50 may be threaded into position to compress the grounding clamp 100. For example, the inner surfaces of the first and second end compression members 40, 50 may have a threaded configuration, which corresponds to a threaded configuration of the inner surface of the outer shell, proximate the ends of the outer shell 60. Thus, the grounding clamp 100 may be securably positioned on the cable 10 by rotating the first and second end compression members 40, 50 to axially compress the grounding clamp 100. Similarly, in another embodiment, the first and second end compression members 40, 50 may axially compress the ends of the grounding clamp 100 with the use of a torque wrench. The first and second end compression members 40, 50 may be dimensioned similar to a tire lug nut, and may be turned, rotated, wrenched, etc. to provide axial compression to the grounding clamp 100.

In most embodiments, a compression tool axially compresses first and second end compression members 40, 50, which compress the elastomeric sleeve 20, which drives the conductive bonding contact 30 into the exposed outer conductive portion of the coaxial cable 10. However, axial compression may be generated through the use of one or more fastener members, such as a screw or bolt, to drive the first and/or second end compression members 40, 50. Upon axial compression of the grounding clamp 100, the conductive bonding contact 30 may conform to the surface of the outer conductive portion of the cable 10 to establish and maintain physical and electrical continuity throughout the grounding clamp 100. For example, the compression tool may axially compress the grounding clamp 100, forcing the conductive bonding contact 30 to mate with the stripped channel of the prepared coaxial cable 10. Furthermore, the axial compression of the grounding clamp 100 also facilitates the electrical contact between the conductive bonding contact 30 and the outer shell 60 via the physical contact between the conductive bridge member 35 and internal surface 67 of the outer shell 60. After the grounding clamp 100 is operably affixed to the coaxial cable 10, the grounding clamp 100 may then be connected to conductive connectors such as a grounding lug, grounding wires via studs, band clamps, or bolting to a bus bar. Alternatively, the grounding clamp 100 may be preassembled and then slid onto the cable into a desired position along the cable.

Referring still to FIGS. 1-3, a method for maintaining ground continuity through a coaxial cable 10 may comprise the steps of providing a grounding clamp 100 comprising an outer shell 60 having a first end 61 and an opposing second end 62, wherein at least a portion of the outer shell 60 is conductive, an elastomeric sleeve 20, sized for coaxial insertion within the outer shell 60 between the first end 61 and the second end 62, the elastomeric sleeve 20 configured to substantially surround a prepared portion of a coaxial cable 10, a conductive bonding contact 30, sized for coaxial insertion within the elastomeric sleeve 20 and having a conductive bridge member 35 structured to make electrical contact with the outer shell 60, a first end compression seal member 40, sized so that a portion thereof is compressably insertable into the first end 61 of the outer shell 60, and a second end compression seal member 50, sized so that a portion thereof is insertable into the second end 62 of the outer shell 60, and compressing the grounding clamp 100 to securably attach and seal the grounding clamp 100 to the coaxial cable 10. The grounding clamp 100 may be compressed by a compression tool, wherein compressing the grounding clamp 100 drives the conductive bonding contact 30 into an exposed outer conductive portion of the coaxial cable 10, further wherein the conductive bonding contact 30 conforms to the surface of the exposed outer conductive portion of the coaxial cable 10. Furthermore, the first end compression seal member 40 and the second end compression seal member 50 may effectively seal the ends of the grounding clamp 100 and prevent corrosion and entry of environmental pollutions.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A compression style mid-span coaxial cable grounding clamp device comprising:
    an outer shell, having a first end and an opposing second end, wherein at least a portion of the outer shell is conductive;
    an elastomeric sleeve, sized for coaxial insertion within the outer shell between the first end and the second end, the elastomeric sleeve configured to substantially surround a prepared portion of a coaxial cable;
    a conductive bonding contact, sized for coaxial insertion within the elastomeric sleeve and having a conductive bridge member structured to make electrical contact with the outer shell, when the conductive bonding contact is disposed within the outer shell; and
    a first end compression seal member, sized so that a portion thereof is compressably insertable into the first end of the outer shell;
    wherein, when the first end compression seal member is compressed into a first end of the outer shell, the elastomeric sleeve is compressed moving the conductive bonding contact into contact with an outer conductor of the prepared coaxial cable when the cable is disposed within the grounding clamp device, and the first compression seal member forms an annular seal around an outer jacket of the coaxial cable at the first end of the outer shell, thereby effectively sealing the grounding clamp device to the coaxial cable.

2. The compression style mid-span coaxial cable grounding clamp device of claim 1, wherein the outer conductor of the prepared coaxial cable is a conductive grounding shield exposed by removing a portion of an outer jacket of the coaxial cable.

3. The compression style mid-span coaxial cable grounding clamp device of claim 1, wherein the outer conductor of the prepared coaxial cable is a foil layer exposed by removing a portion of an outer jacket and a portion of the conductive grounding shield of the coaxial cable.

4. The compression style mid-span coaxial cable grounding clamp device of claim 1, wherein the first end compression seal member and a second end compression seal member effectively seal the ends of the grounding clamp and prevent corrosion and entry of environmental pollutions.

5. The compression style mid-span coaxial cable grounding clamp device of claim 1, wherein an opening is axially positioned across the elastomeric sleeve to facilitate contact between the conductive bridge member and an internal surface of the outer shell.

6. A grounding clamp comprising:
an outer shell surrounding an elastomeric sleeve, the outer shell having a first end and an opposing second end, wherein the outer shell is at least partially conductive;
a conductive member surrounded by the elastomeric sleeve, the conductive member surrounding an exposed outer conductive portion of a coaxial cable;
wherein axial compression drives the conductive member into contact with the exposed outer conductive portion of the coaxial cable to facilitate an adequate electrical grounding connection.

7. The grounding clamp of claim 6, further comprising:
a first compression end compressably inserted into the first end of the outer shell to environmentally seal the grounding clamp at one end of the grounding clamp; and
a second compression end compressably inserted into the second of the outer shell to environmentally seal the grounding clamp at an opposing end of the grounding clamp.

8. The grounding clamp of claim 6, wherein at least a portion of the outer shell is conductive.

9. The grounding clamp of claim 6, wherein the axial compression causes the conductive member to conform to the surface of the outer conductive portion of a coaxial cable.

10. The grounding clamp of claim 6, further comprising:
a conductive bridge member positioned axially along an external surface of the conductive member; and
an opening positioned axially along the elastomeric sleeve, wherein the axial compression of the grounding clamp causes the conductive bridge member to contact an internal surface of the outer shell through the opening along the elastomeric sleeve;
wherein the conductive bridge member is axially aligned with the opening of the elastomeric sleeve.

11. A device comprising:
a grounding clamp configured to be positioned on a coaxial cable at a location other than an end of the coaxial cable, wherein the grounding clamp includes an outer shell having a radial relationship with an elastomeric sleeve, the elastomeric sleeve being radially disposed over a conductive bonding contact, the conductive bonding contact being radially disposed over an outer conductive portion of the coaxial cable;
wherein axial compression of the grounding clamp facilitates electrical contact between the outer shell and the conductive bonding contact and between the conductive bonding contact and the outer conductive portion of the coaxial cable.

12. The device of claim 11, wherein the outer conductive portion of the coaxial cable is a conductive grounding shield exposed by removing a portion of an outer jacket of the coaxial cable.

13. The device of claim 11, wherein the outer conductive portion of the coaxial cable is a foil layer exposed by removing a portion of an outer jacket and a portion of the conductive grounding shield of the coaxial cable.

14. The device of claim 11, further comprising:
a conductive bridge member positioned axially along an external surface of the conductive bonding contact; and
an opening positioned axially along the elastomeric sleeve, wherein the compression of the grounding clamp causes the conductive bridge member to contact an internal surface of the outer shell through the opening of the elastomeric sleeve;
wherein the conductive bridge member is axially aligned with the opening of the elastomeric sleeve.

15. The device of claim 11, wherein the axial compression of the grounding clamp is actuated by a compression tool.

16. A method for maintaining ground continuity through a coaxial cable comprising:
providing a grounding clamp comprising
an outer shell having a first end and an opposing second end, wherein at least a portion of the outer shell is conductive;
an elastomeric sleeve, sized for coaxial insertion within the outer shell between the first end and the second end, the elastomeric sleeve configured to substantially surround a prepared portion of a coaxial cable;
a conductive bonding contact, sized for coaxial insertion within the elastomeric sleeve and having a conductive bridge member structured to make electrical contact with the outer shell;
a first end compression seal member, sized so that a portion thereof is compressably insertable into the first end of the outer shell; and
a second end compression seal member, sized so that a portion thereof is insertable into the second end of the outer shell; and
compressing the grounding clamp to securably attach and seal the grounding clamp to the coaxial cable.

17. The method of claim 16, wherein the grounding clamp is axially compressed by a compression tool.

18. The method of claim 16, wherein compressing the grounding clamp drives the conductive bonding contact into an exposed outer conductive portion of the coaxial cable, further wherein the conductive bonding contact conforms to the surface of the exposed outer conductive portion of the coaxial cable.

19. The method of claim 16, wherein the first end compression seal member and the second end compression seal member effectively seal the ends of the grounding clamp and prevent corrosion and entry of environmental pollutions.

* * * * *